(12) United States Patent
Tohmon et al.

(10) Patent No.: US 9,123,374 B1
(45) Date of Patent: Sep. 1, 2015

(54) HEAT ASSISTED MAGNETIC RECORDING WRITER HAVING AN INTEGRATED POLARIZATION ROTATION PLATE

(71) Applicant: Western Digital (Fremont), LLC, Fremont, CA (US)

(72) Inventors: Genji Tohmon, Livermore, CA (US); Alexander V. Demtchouk, Sunnyvale, CA (US); Weigang Wang, Fremont, CA (US); Kyung Lee, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/621,287

(22) Filed: Feb. 12, 2015

(51) Int. Cl.
*G11B 11/00* (2006.01)
*G11B 13/08* (2006.01)
*G11B 5/48* (2006.01)
*G11B 5/60* (2006.01)
*G11B 5/31* (2006.01)
*G11B 5/84* (2006.01)
*G11B 5/00* (2006.01)

(52) U.S. Cl.
CPC .............. *G11B 13/08* (2013.01); *G11B 5/3133* (2013.01); *G11B 5/4866* (2013.01); *G11B 5/6088* (2013.01); *G11B 5/84* (2013.01); *G11B 2005/0021* (2013.01)

(58) Field of Classification Search
CPC ...................... G11B 5/4866; G11B 2005/0021; G11B 5/314; G11B 5/6088; G11B 2005/001; G11B 7/1387; G11B 13/045; G11B 13/08; G11B 5/3133; G11B 5/3163
USPC ............................... 369/13.33, 13.13, 112.27
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |

(Continued)

FOREIGN PATENT DOCUMENTS

EP  2388781  1/2015

OTHER PUBLICATIONS

Van Popta, et al., "Birefringence enhancement in annealed TiO2 thin films," Journal of Applied Physics 102, 013517 (Jul. 2007).

(Continued)

*Primary Examiner* — Ali Neyzari

(57) ABSTRACT

A heat assisted magnetic recording (HAMR) writer is described. The HAMR writer includes a laser, a polarization rotation plate and a HAMR transducer. The laser provides energy having a first polarization state. The polarization rotation is plate optically coupled with the laser and changes the first polarization state to a second polarization state. The transducer has an ABS, a waveguide, a main pole, at least one coil and a near-field transducer (NFT). The polarization rotation plate is between the transducer and the laser. The waveguide is optically coupled with the laser through the polarization rotation plate and directs the energy from the polarization rotation plate toward the ABS. The NFT focuses the energy onto a media. The NFT is optically coupled with the waveguide and receives energy having a third polarization state. The main pole writes to the media and is energized by the coil(s).

21 Claims, 8 Drawing Sheets

(56) References Cited

U.S. PATENT DOCUMENTS

| | | |
|---|---|---|
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |

(56) References Cited

U.S. PATENT DOCUMENTS

| | | |
|---|---|---|
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |

(56) References Cited

U.S. PATENT DOCUMENTS

| | | |
|---|---|---|
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| RE40,655 E | 3/2009 | Arakawa et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,040,760 B2 * | 10/2011 | Challener et al. ......... 369/13.29 |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,218,405 B2 | 7/2012 | Kurita et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,395,971 B2 | 3/2013 | Sasaki et al. |
| 8,400,592 B2 | 3/2013 | Hirakata et al. |

(56) References Cited

U.S. PATENT DOCUMENTS

| | | |
|---|---|---|
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,503,271 B2 | 8/2013 | Zhou et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,705,325 B2 * | 4/2014 | Matsumoto ................ 369/13.33 |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2008/0049563 A1 | 2/2008 | Konno et al. |
| 2009/0244778 A1 | 10/2009 | Hasegawa et al. |
| 2010/0123965 A1 | 5/2010 | Lee et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0108212 A1 | 5/2013 | Peng et al. |
| 2013/0216702 A1 | 8/2013 | Kaiser et al. |
| 2013/0216863 A1 | 8/2013 | Li et al. |

(56) References Cited

U.S. PATENT DOCUMENTS

2013/0243017 A1   9/2013   Ushinsky
2013/0257421 A1   10/2013  Shang et al.
2014/0154529 A1   6/2014   YANG; Cheng-Han; et al.
2014/0175050 A1   6/2014   ZHANG; JINQIU; et al.

OTHER PUBLICATIONS

Park, et al., "Optical Properties of TiO2 Zigzag Films Prepared by Using Oblique Angle Deposition," Journal of the Korean Physical Society, vol. 56, No. 4, Apr. 2010, pp. 1378-1381 (Sep. 2009).

* cited by examiner

US 9,123,374 B1

HEAT ASSISTED MAGNETIC RECORDING WRITER HAVING AN INTEGRATED POLARIZATION ROTATION PLATE

BACKGROUND

A conventional heat assisted magnetic recording (HAMR) transducer typically includes at least a waveguide, a near-field transducer (NFT), a main pole and a coil for energizing the main pole. The conventional HAMR transducer uses light, or energy, received from a conventional laser in order to write to a magnetic recording media. Light from the laser is incident on and coupled into the waveguide. Light is guided by the conventional waveguide to the NFT near the ABS. The NFT focuses the light to magnetic recording media (not shown), such as a disk. This region is thus heated. The main pole is energized and field from the pole tip is used to write to the heated portion of the recording media.

Although the conventional HAMR transducer functions, improvements in performance are still desired.

DETAILED DESCRIPTION OF THE PREFERRED EMBODIMENTS

Figure 1:
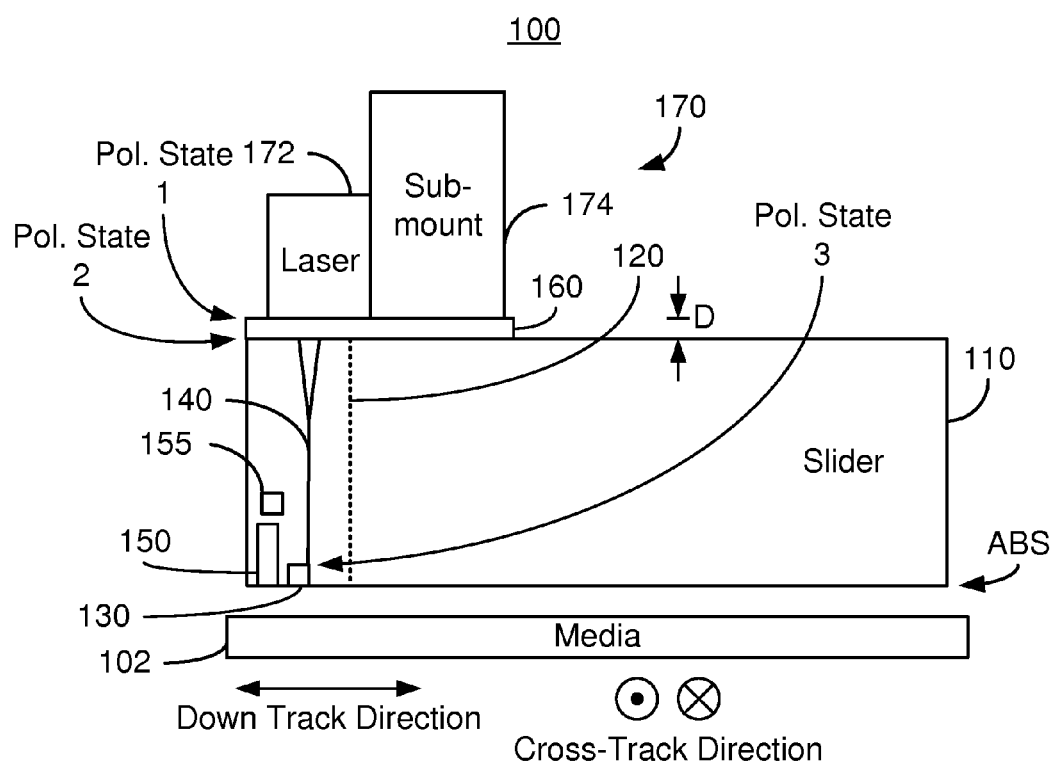
FIG. 1 is a diagram depicting a side view of an exemplary embodiment of a HAMR disk drive.

FIG. 1 depicts a side view of an exemplary embodiment of a portion of a heat-assisted magnetic recording (HAMR) write apparatus, or disk drive 100. For clarity, FIG. 1 is not to scale. For simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 is not shown. For simplicity, only single components are shown. However, multiples of each component and their sub-components, might be used.

The HAMR disk drive 100 includes media 102, a slider 110, a HAMR transducer 120, a polarization rotation plate 160 and a laser subassembly 170. Additional and/or different components may be included in the HAMR disk drive 100. Although not shown, the slider 110, and thus the laser assembly 170 and HAMR transducer 120 are generally attached to a suspension (not shown). The laser assembly 170 includes a laser 172 and a submount 174. The submount 174 is a substrate to which the laser 172 may be affixed for improved mechanical stability, ease of manufacturing and better robustness. The laser 172 may be a chip such as a laser diode or other laser. The laser 172 outputs energy having a particular polarization state, indicated as Polarization State 1 (first polarization state) in FIG. 1. In some embodiments, this first polarization state may be for light linearly polarized in the cross-track direction. The laser 172 outputs this light energy through the surface closest to the HAMR transducer 120.

The HAMR transducer 120 is fabricated on the slider 110 and includes an air-bearing surface (ABS) proximate to the media 102 during use. In general, the HAMR write transducer 120 and a read transducer are present in the HAMR write apparatus 100. However, for clarity, only the HAMR write transducer 120 is shown. As can be seen in FIG. 1, HAMR transducer 120 includes a near-field transducer (NFT) 130, a waveguide 140, a main pole 150 and coil(s) 155. The waveguide 140 is optically coupled with the laser 172 through the polarization rotation plate 160, discussed below. The waveguide 140 carries light energy from the laser 172 to the ABS. The NFT 130 couples a portion of this energy from the waveguide 140 to the media 102. In some embodiments, the NFT 130 occupies a portion of the ABS. The NFT 130 transfers energy to the media 102. The write pole 150 is energized by the coils 155 and writes to the media 102. The coil(s) 155 may be solenoidal or spiral (pancake) coils. Other components including but not limited to other poles and/or shields may also be present.

In some embodiments, the NFT 130 may be configured to propagate a surface plasmon polariton. In such embodiments, the NFT 130 may be desired to utilize a transverse magnetic (TM) mode oriented in the down track direction. In other embodiments, the NFT 130 may be configured to receive energy polarized in a particular manner for other reason(s). The desired polarization of light received by the NFT 130 is depicted as Polarization State 3 (third polarization) in FIG. 1. In some embodiments, the waveguide 140 may also be desired to be excited with linearly polarized light having the TM mode in the down track direction. In other embodiments, the waveguide 140 may have improved efficiency for light polarized in another manner. However, the first polarization state of the light output by the laser 172 may be different than that which is desired. The light energy received by the waveguide 140 is polarized in a second polarization state (Polarization State 2 in FIG. 1).

Thus, the energy output by the laser 172 in the first polarization state may not match the energy desired to be input to the NFT 130 in the third polarization state or to the waveguide 140 in the second polarization state. As a result, the polarization rotation plate 160 is integrated into the HAMR disk drive 100. The polarization rotation plate 160 is between the laser 172 and the HAMR transducer 120. In some embodiments, the polarization rotation plate 160 is integrated onto the back side (opposite the ABS) of the slider 110. In such embodiments, the polarization plate 160 may be fabricated onto the slider back side. In other embodiments, the polarization rotation plate 160 is integrated onto/fabricated onto the surface of the laser 172. For example, the polarization rotation plate 160 may be fabricated on the surface of the laser 172 through which light is emitted.

The polarization rotation plate 170 is optically coupled with the laser 172 and changes the polarization of the energy passing through the polarization rotation plate 170 from the first polarization state to the second polarization state. In some embodiments, the polarization rotation plate 160 rotates the polarization to a state that is desired for the NFT 130. In such an embodiment, the second polarization state is the same as the third polarization state. In other embodiments, the polarization of the energy exiting the polarization rotation plate 160 may be further altered. For example, the waveguide 140 may be configured to rotate the polarization from the second state to the third state. In other embodiments, an additional component might be used between the polarization rotation plate 160 and the laser 172, between the polarization rotation plate 160 and the waveguide 140, between the laser 172 and the polarization rotation plate 160, or in another location between the polarization rotation plate 160 and the NFT 130.

For example, the NFT 130 may be configured for light that is linearly polarized in the down track direction, while the laser 172 outputs light polarized in the cross-track direction. In some embodiments, the polarization rotation plate 160 may be a half-wave plate. Thus, the polarization of light entering the polarization rotation plate 160 form the laser 172 is rotated by ninety degrees. The light exiting the polarization rotation plate may have its TM mode in the down track direction as desired. In such an embodiment, the second and third polarization states are the same. Thus, the waveguide 140 or other optical component between the polarization rotation plate 160 and the NFT 130 does not change the polarization of the energy. In other embodiments, the polarization rotation plate 160 may be a quarter-wave plate or may change the polarization in another manner. In the case of a quarter-wave plate, the polarization of light entering the polarization rotation plate 160 form the laser 172 is rotated to be circularly polarized. In other cases, the polarization of the light may be changed in another manner. In such an embodiment, the second and third polarization states are different. In order for the light entering the NFT to have its TM mode in the down track direction, the waveguide 140 or other optical component between the laser 172 and the NFT 130 changes the polarization of the energy to match the desired polarization state.

In order to be integrated into the HAMR disk drive 100, the polarization rotation plate 160 may be desired to be thin. Such a thin film polarization rotation plate might be fabricated using photolithography and analogous techniques. For example, the thickness, D, of the polarization rotation plate 160 may be desired to be not more than 10 micrometers. In some embodiments, thinner plates may be possible. For example, the polarization rotation plate 160 may be at least one micrometer and not more than six micrometers thick. In some embodiments, the polarization rotation plate may be not more than four microns thick. Other thicknesses may be possible.

The polarization rotation plate 160 may perform its functions through the use of birefringent material(s). In a birefringent materials, light propagating across different optical axes accrues a differential phase delay. Because light travels at different speeds along different axes, the index of refraction for the axes differ. A measure of the birefringence of the material is the difference in the indices of refraction along the ordinary and extraordinary optical axes. Thus, the birefringence is given by $\Delta n$, where $\Delta n = n_{ordinary} - n_{extraordinary}$. The thickness of the polarization rotation plate is given by $D = j\lambda/(\Delta n)$, where $j=0.5$ for a half-wave plate (ninety degree rotation) and 0.25 for a quarter-wave plate (circular polarization). Other values of j are possible. The birefringence, $\Delta n$, of the material(s) used for the polarization rotation plate 160 is desired to be sufficiently high that the thicknesses described above may be achieved. For example, in some embodiments, the birefringence of the birefringent material(s) used in the polarization rotation plate may have a birefringence ($\Delta n$) of at least 0.1. As used herein, a high birefringence is one which is at least 0.1. Thus, the polarization rotation plate 160 may have a reduced thickness in the desired range.

Although not shown in FIG. 1, antireflective coatings may be used in connection with the polarization rotation plate 160. For example, the surface of the polarization rotation plate 160 adjacent to the laser 172 and/or the surface of the polarization rotation plate 160 adjacent to the waveguide 140 may be covered by antireflective coatings. The use of such antireflective may improve the coupling efficiency of light into and out of the polarization rotation plate 160.

In operation, the laser 172 emits light having the first polarization state. The light then traverses the polarization rotation plate 160. Upon exiting the polarization rotation plate 160, the polarization of the light has been rotated to the second polarization state. The light then enters the waveguide 140. The waveguide 140 directs the light to the NFT 130. The waveguide 140 or other component may optionally change the polarization of the light. Thus, light entering the NFT 130 has a third polarization state. The NFT 128 focuses the light to a region of magnetic recording media 102. High density bits can be written on a high coercivity medium with the pole 150 energized by the coils 155 to a modest magnetic field.

The HAMR disk drive 100 may exhibit enhanced performance. Using the polarization rotation plate 160, the polarization of the light energy from the laser 172 can be rotated to be in the desired direction. Thus, energy having the desired polarization can be provided to the NFT 130. For example, an NFT 130 that propagates surface plasmon polariton can be used in the HAMR transducer 100. In addition, a lower cost laser 172 that produces light linearly polarized in the cross-track direction may be used in the HAMR disk drive 100. Thus, performance of the HAMR disk drive may be improved.

Figure 2:
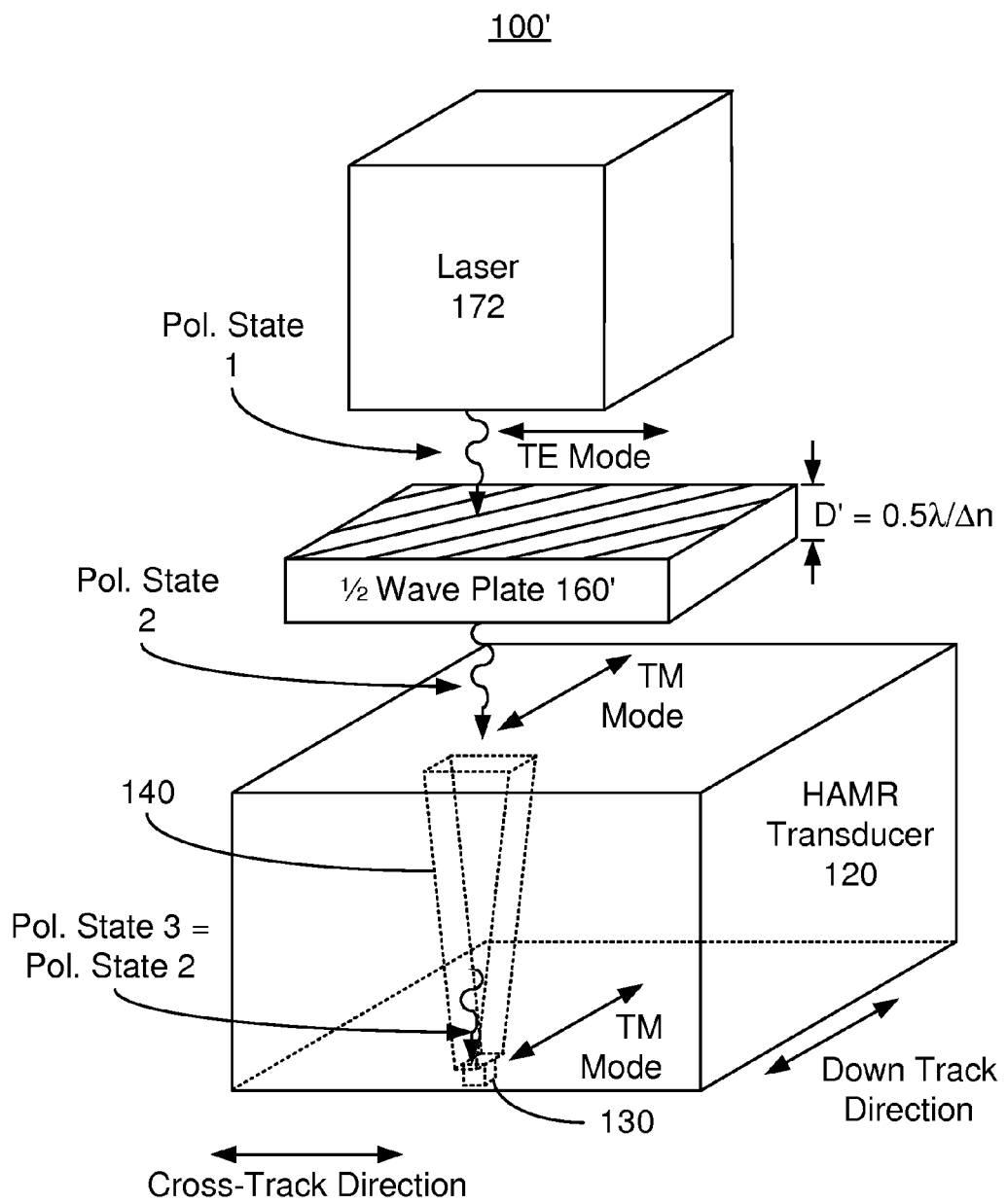
FIG. 2 is a diagram depicting an exploded perspective view of an exemplary embodiment of a portion of a HAMR writer.

FIG. 2 depicts an exploded perspective view of another exemplary embodiment of a portion of the HAMR disk drive 100'. For clarity, FIG. 2 is not to scale. For simplicity not all portions of the HAMR disk drive 100' are shown. In addition, although the HAMR disk drive 100' is depicted in the context of particular components other and/or different components may be used. Further, the arrangement of components may vary in different embodiments. The HAMR disk drive 100' is analogous to the HAMR disk drive 100. Consequently, similar components have analogous labels. The HAMR disk drive 100' thus includes a laser 172, a polarization rotation plate 160' and a HAMR transducer 120 that includes a waveguide 140, NFT 130 that are analogous to the laser 172, polarization rotation plate 160 and HAMR transducer 120 including waveguide 140 and NFT 130, respectively. For clarity, components such as the pole and coils have been omitted.

As can be seen in FIG. 2, the polarization rotation plate 160' is a half-wave plate 160'. The half-wave plate 160' has a thickness D' in the transmission direction of the light that is $0.5\lambda/\Delta n$, where $\lambda$ is the wavelength of the light emitted by the laser 172 and $\Delta n$ is the birefringence of the material used for the half-wave plate 160'. As discussed above, $\Delta n$ is desired to be large—on the order of 0.1 or more. Thus, high birefringent material(s), such as $TiO_2$, may be used for the half-wave plate 160'. In other embodiments, other material(s) having different birefringence(s) may be used. The thickness D' of the half-wave plate 160' may be less than ten micrometers. In some embodiments, the thickness of the half-wave plate 160' is at least one micrometer and not more than six micrometers.

The laser 172 outputs light having a first polarization state, with the transverse electric (TE) mode in the cross track direction. After passing through the half-wave plate 160', the light energy has its polarization rotated by ninety degrees.

Thus, the second polarization state of the light exiting the half-wave plate 160' is with TM mode polarized in the down track direction. The light is carried from the half-wave plate 160' to the waveguide 140 and the NFT 130. Because the polarization of the light is not further changed, the light energy coupled into the NFT 130 has a third polarization state that is the same as the second polarization state. Stated differently, this light provided to the NFT 130 is polarized in the down track direction. The NFT may then couple the energy from this light to the media (not shown in FIG. 2) and the write pole (not shown in FIG. 2) used to magnetically write to the heated portion of the media.

The HAMR disk drive 100' shares the benefits of the HAMR transducer 100. Using the half-wave plate 160', the polarization of the light energy from the laser 172 can be rotated to be in the desired direction. Thus, energy having the desired polarization can be provided to the NFT 130. Efficiency and reliability of the NFT 130 may thus be improved. In addition, a lower cost laser 172 that produces light linearly polarized in the cross-track direction may be used in the HAMR disk drive 100'. Thus, performance of the HAMR disk drive 100' may be improved.

Figure 3:
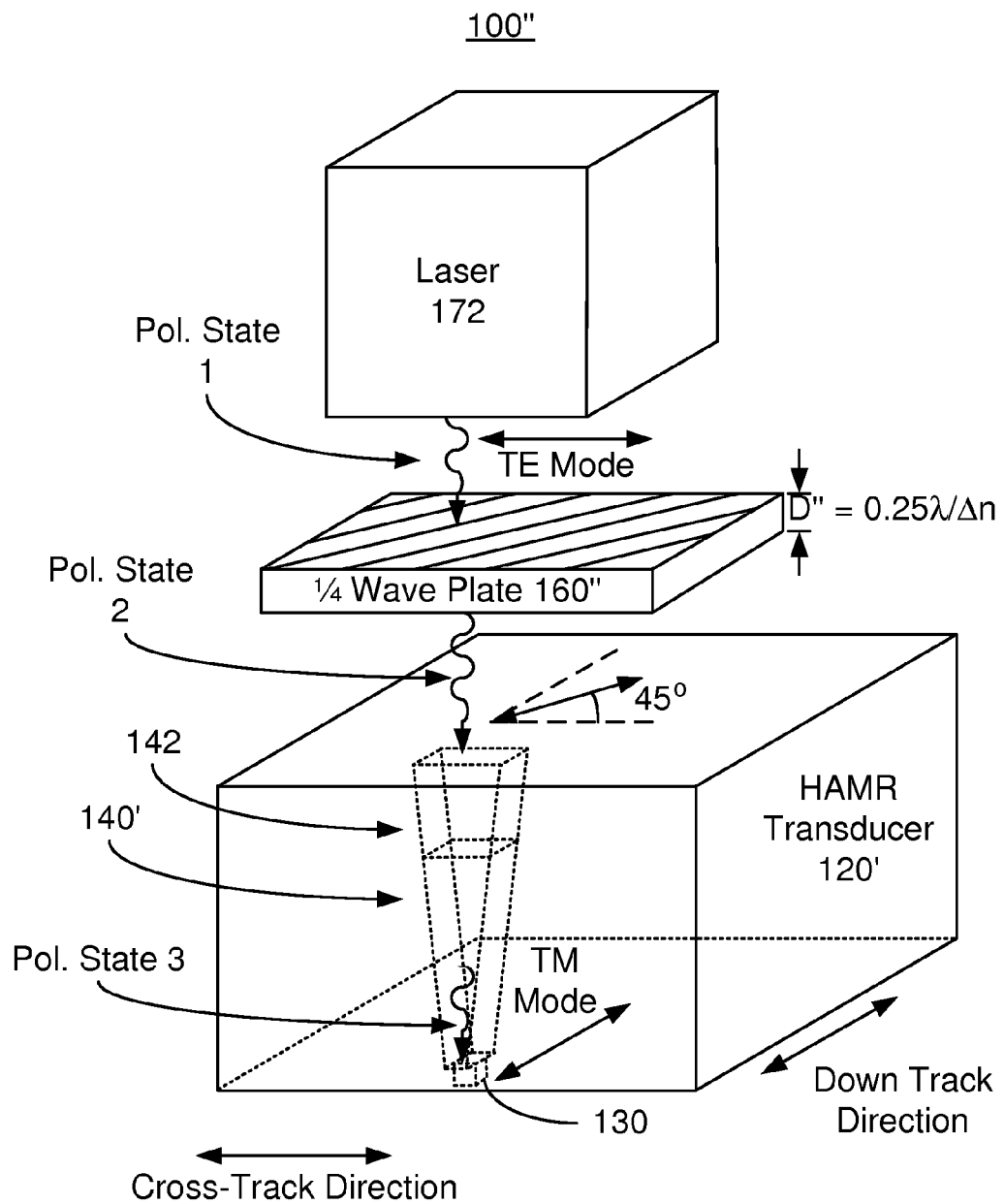
FIG. 3 is a diagram depicting an exploded perspective view of another exemplary embodiment of a portion of a HAMR writer.

FIG. 3 depicts an exploded perspective view of another exemplary embodiment of a portion of the HAMR disk drive 100". For clarity, FIG. 3 is not to scale. For simplicity not all portions of the HAMR disk drive 100" are shown. In addition, although the HAMR disk drive 100" is depicted in the context of particular components other and/or different components may be used. Further, the arrangement of components may vary in different embodiments. The HAMR disk drive 100" is analogous to the HAMR disk drives 100 and 100'. Consequently, similar components have analogous labels. The HAMR disk drive 100" thus includes a laser 172, a polarization rotation plate 160" and a HAMR transducer 120' that includes a waveguide 140', NFT 130 that are analogous to the laser 172, polarization rotation plate 160/160' and HAMR transducer 120 including waveguide 140 and NFT 130, respectively. For clarity, components such as the pole and coils have been omitted.

As can be seen in FIG. 3, the polarization rotation plate 160" is a quarter-wave plate 160". The quarter-wave plate 160" has a thickness D" in the transmission direction of the light that is $0.25\lambda/\Delta n$, where $\lambda$ is the wavelength of the light emitted by the laser 172 and $\Delta n$ is the birefringence of the material used for the quarter-wave plate 160". As discussed above, $\Delta n$ is desired to be large—on the order of 0.1 or more. Thus, high birefringent material(s), such as $TiO_2$, may be used for the quarter-wave plate 160'. In other embodiments, other material(s) that may have other birefringence(s) may be used. Thus, the thickness D" of the half-wave plate 160' may be less than ten micrometers. In some embodiments, the thickness of the quarter-wave plate 160' is at least one micrometer and not more than six micrometers. After traversing the quarter-wave plate 160", the light has a second polarization state that is circularly polarized.

In addition, the HAMR transducer 120' is depicted as including rotation component 142. The rotation component 142 may be part of the waveguide 140' or a separate component between the quarter-wave plate 140' and the NFT 130. The rotation component 142 may be used to filter the undesired rotation state(s) or otherwise change the polarization of the light to be the desired polarization. If the rotation component 142 is considered to be part of the waveguide 140', then the waveguide 140' is configured to provide this polarization change. Thus, the third polarization state of the light entering the NFT 130 is in the down track direction as shown in FIG. 3.

In operation, the laser 172 provides light having a first polarization state, with the TE mode in the cross track direction. After passing through the quarter-wave plate 160", the light energy is circularly polarized. The light is carried from the quarter-wave plate 160" to the waveguide 140'/rotation component 142 and the NFT 130. The polarization of the light is changed by some combination of the waveguide 140' and/or component 142 such that the light energy coupled into the NFT 130 has a third polarization state, with the TM mode in the down track direction. Thus, this light provided to the NFT 130 is polarized in the down track direction. The NFT may then couple the energy from this light to the media (not shown in FIG. 3) and the write pole (not shown in FIG. 3) used to write to the heated portion of the media.

The HAMR disk drive 100" shares the benefits of the HAMR transducer(s) 100 and/or 100'. Using a combination of the quarter-wave plate 160" and rotation component 142/waveguide 140', the polarization of the light energy from the laser 172 can be rotated to be in the desired direction. Thus, energy having the desired polarization can be provided to the NFT 130. Efficiency and reliability of the NFT 130 may thus be improved. In addition, a lower cost laser 172 that produces light linearly polarized in the cross-track direction may be used in the HAMR disk drive 100". Further, use of the combination of the polarization rotation plate 160" and the rotation component 142/waveguide 140' may be easier to manufacture. The efficiency of coupling light from the laser 172 into the transducer 120' may also be improved by splitting the polarization rotation change between multiple components 160" and 142/140'. Thus, performance of the HAMR disk drive 100" may be improved.

Figure 4:
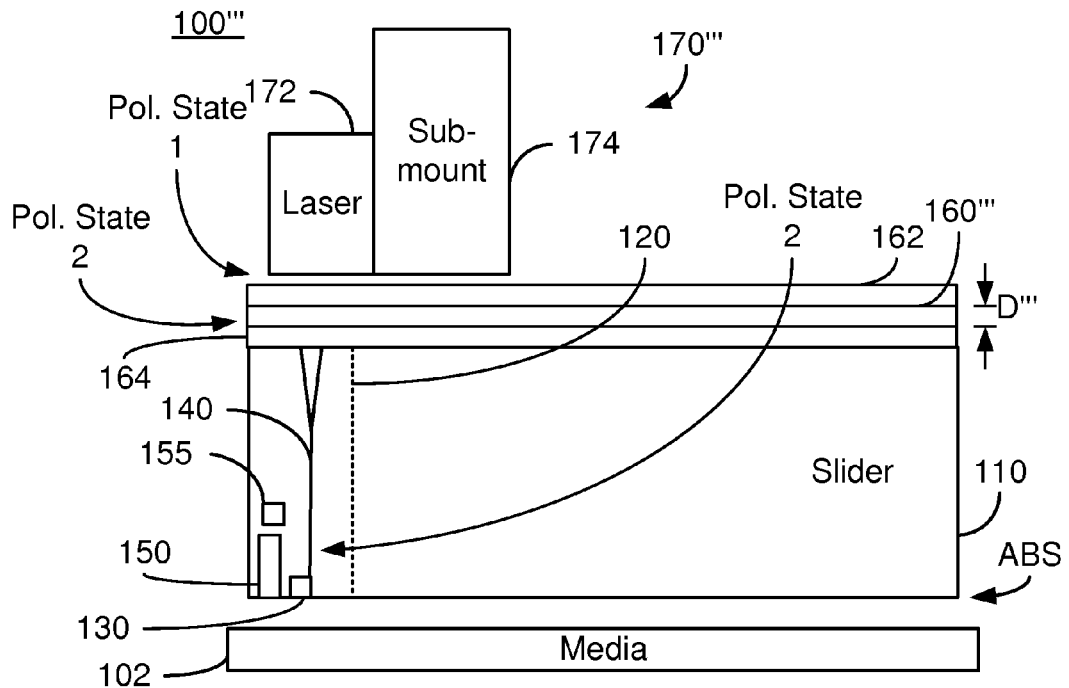
FIG. 4 is a diagram depicting a side view of another exemplary embodiment of a HAMR writer.
Figure 5:
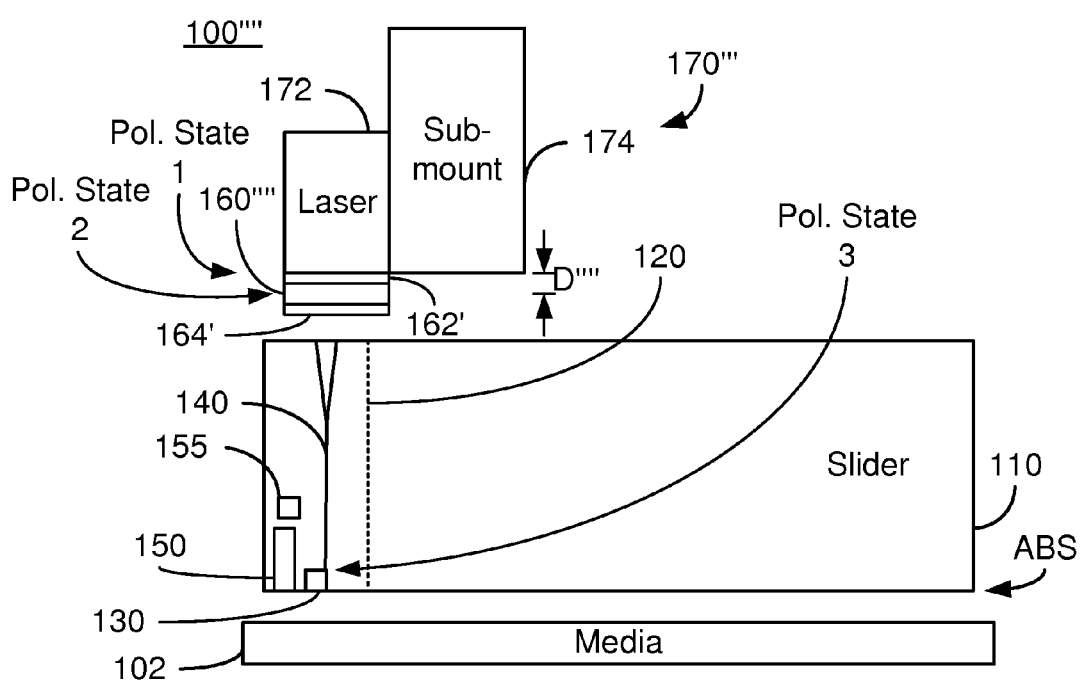
FIG. 5 is a diagram depicting a side view of another exemplary embodiment of a HAMR writer.

Although not shown in FIGS. 1-3, antireflective coatings may be used in conjunction with the polarization rotation plates 160, 160' and/or 160". In addition, the polarization rotation plates 160, 160' and/or 160" may be fabricated on the laser 172 or the transducer 120/120'. FIGS. 4 and 5 depict side views of HAMR disk drives 100''' and 100'''', respectively, that illustrate two such embodiments.

FIG. 4 depicts an exploded side view of another exemplary embodiment of a portion of the HAMR disk drive 100'''. For clarity, FIG. 4 is not to scale. For simplicity not all portions of the HAMR disk drive 100''' are shown. In addition, although the HAMR disk drive 100''' is depicted in the context of particular components other and/or different components may be used. Further, the arrangement of components may vary in different embodiments. The HAMR disk drive 100''' is analogous to the HAMR disk drives 100, 100' and/or 100". Consequently, similar components have analogous labels. The HAMR disk drive 100''' thus includes a laser 172, a polarization rotation plate 160''' and a HAMR transducer 120 that includes a waveguide 140, NFT 130 that are analogous to the laser 172, polarization rotation plate 160/160'/160" and HAMR transducer 120/120' including waveguide 140/140' and NFT 130, respectively. For clarity, components such as the pole and coils have been omitted. In addition, any component 142 is omitted for simplicity.

As can be seen in FIG. 4, the polarization rotation plate 160''' is fabricated on the slider back side. The polarization rotation plate 160''' may be a quarter-wave plate, a half-wave plate or other polarization rotator. If the laser 172 outputs energy polarized with the TE direction in the cross-track direction, then the polarization rotation plate 160''' and other optical component(s) between the laser 172 and the NFT 130 may combine to rotate the polarization of light to be polarized with the TM mode in the down track direction by the time the light is coupled into the NFT 130.

Also shown in FIG. 4 are antireflective coatings 162 and 164. Although antireflective coatings 162 and 164 are shown on both the entrance and exit surfaces of the polarization rotation plate 160''', in other embodiments, one or both of the coatings 162 and/or 164 may be omitted. In some embodiments, the antireflective coating(s) include multilayer(s). For example, the antireflective coatings 162 and 164 may be a bilayer including a layer of $Si_3N_4$ having one index of refraction and another layer of $SiO_2$ having another index of refraction. Other multilayers are also possible. The polarization rotation plate 160''' and the antireflective coatings 162 and 164 are fabricated on the back side of the slider 110. In the embodiment shown, the polarization rotation plate 160''' and the antireflective coatings 162 and 164 occupy the entire back surface of the slider 110. In other embodiments, the components 160''', 162 and/or 164 may be patterned such that only a portion of the back surface of the slider 110 is covered.

The HAMR disk drive 100''' operates in an analogous manner to the HAMR disk drive 100, 100', and/or 100''. Consequently, the HAMR disk drive 100''' shares the benefits of the HAMR transducer(s) 100, 100' and/or 100''. Using a combination of the polarization rotation plate 160''' and, optionally, other component(s), the polarization of the light energy from the laser 172 can be rotated to be in the desired direction. Thus, energy having the desired polarization can be provided to the NFT 130. Efficiency and reliability of the NFT 130 may thus be improved. In addition, a lower cost laser 172 that produces light linearly polarized in the cross-track direction may be used in the HAMR disk drive 100'''. Further, use of the antireflective coatings 162 and 164 may enhance the coupling efficiency for the polarization rotation plate 160''. Thus, performance of the HAMR disk drive 100''' may be improved.

FIG. 5 depicts an exploded side view of another exemplary embodiment of a portion of the HAMR disk drive 100''''. For clarity, FIG. 5 is not to scale. For simplicity not all portions of the HAMR disk drive 100'''' are shown. In addition, although the HAMR disk drive 100'''' is depicted in the context of particular components other and/or different components may be used. Further, the arrangement of components may vary in different embodiments. The HAMR disk drive 100'''' is analogous to the HAMR disk drives 100, 100', 100'', and/or 100'''. Consequently, similar components have analogous labels. The HAMR disk drive 100'''' thus includes a laser 172, a polarization rotation plate 160'''' and a HAMR transducer 120 that includes a waveguide 140, NFT 130 that are analogous to the laser 172, polarization rotation plate 160/160'/160''/160''' and HAMR transducer 120/120' including waveguide 140/140' and NFT 130, respectively. For clarity, components such as the pole and coils have been omitted. In addition, any component 142 is omitted for simplicity.

As can be seen in FIG. 5, the polarization rotation plate 160'''' is fabricated on the surface of the laser 172 that emits light. The polarization rotation plate 160'''' may be a quarter-wave plate, a half-wave plate or other polarization rotator. If the laser 172 outputs energy polarized with the TE direction in the cross-track direction, then the polarization rotation plate 160'''' and other optical component(s) between the laser 172 and the NFT 130 may combine to rotate the polarization of light to be polarized with the TM mode in the down track direction by the time the light is coupled into the NFT 130.

Also shown in FIG. 5 are antireflective coatings 162' and 164'. The antireflective coatings 162' and 164' are analogous to the antireflective coatings 162 and 164, respectively. Although antireflective coatings 162' and 164' are shown on both the entrance and exit surfaces of the polarization rotation plate 160''', in other embodiments, one or both of the coatings 162' and/or 164' may be omitted. In some embodiments, the antireflective coating(s) include multilayer(s), as discussed above. The polarization rotation plate 160'''' and the antireflective coatings 162' and 164' are fabricated on the surface of the laser 172. In the embodiment shown, the polarization rotation plate 160'''' and the antireflective coatings 162' and 164' occupy the entire back surface of the laser 172. In other embodiments, the components 160'''', 162' and/or 164' may be patterned such that only a portion of the back surface of the laser 172 is covered.

The HAMR disk drive 100'''' operates in an analogous manner to the HAMR disk drive 100, 100', 100'' and/or 100'''. Consequently, the HAMR disk drive 100'''' shares the benefits of the HAMR transducer(s) 100, 100', 100'' and/or 100'''. Using a combination of the polarization rotation plate 160'''' and, optionally, other component(s), the polarization of the light energy from the laser 172 can be rotated to be in the desired direction. Thus, energy having the desired polarization can be provided to the NFT 130. Efficiency and reliability of the NFT 130 may thus be improved. In addition, a lower cost laser 172 that produces light linearly polarized in the cross-track direction may be used in the HAMR disk drive 100''''. Use of the antireflective coatings 162' and 164' may also enhance the coupling efficiency for the polarization rotation plate 160''''. Thus, performance of the HAMR disk drive 100'''' may be improved.

Figure 6:
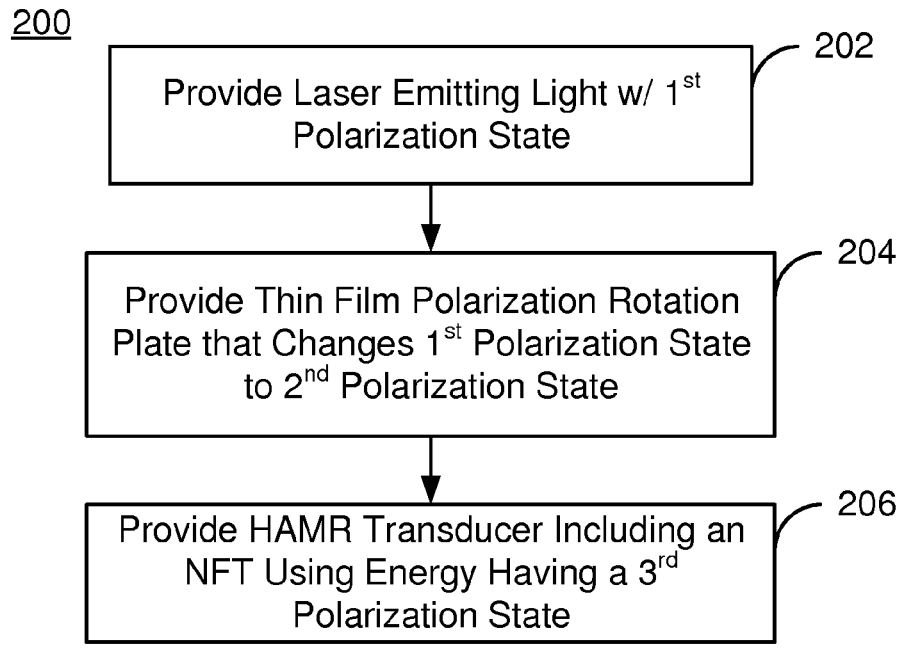
FIG. 6 is a flow chart depicting an exemplary embodiment of a method for fabricating a HAMR disk drive.

FIG. 6 is a flow chart depicting an exemplary embodiment of a method 200 for fabricating a HAMR write disk drive. The method 200 may be used in fabricating disk drives such as the disk drives 100, 100', 100'', 100''' and/or 100'''', though other transducers might be so fabricated. For clarity, the method 200 is described in the context of the disk drives depicted in FIGS. 1-3. For simplicity, some steps may be omitted, performed in another order, interleaved and/or combined. The HAMR disk drives being fabricated may include a writer and a read transducer (not shown) and resides on a slider. For simplicity, however, the reader is not discussed. The method 200 is also described in the context of providing a single laser, transducer and polarization rotation plate. However, the method 200 may be used to fabricate multiple laser(s), transducer(s) and/or polarization rotation plates at substantially the same time. The method 200 and system are also described in the context of particular layers. However, in some embodiments, such layers may include multiple sublayers. The method 200 also may commence after formation of other portions of the disk drive.

A laser 172 that emits energy having a first polarization state is provided, via step 202. In some embodiments, step 202 may include obtaining the desired laser and affixing the laser 172 to a submount 174. Step 202 may also include affixing the laser subassembly 170 to the slider 110, which is discussed below.

A polarization rotation plate 160/160'/160'' that can be optically coupled with the laser 172 is provided, via step 204. Step 204 may include fabricating the polarization rotation plate 160/160'/160'' on the laser or on the slider 110, as is shown in FIGS. 5 and 4, respectively. Alternatively, a stand-alone polarization rotation plate may be used in step 202 if the plate can be integrated into the HAMR disk drive 100/100'/100'' without adversely affecting performance. The polarization rotation plate 160/160'/160'' changes the first polarization state of the light emitted by the laser 172 to a second polarization state. Step 204 may include multiple substeps including but not limited to depositing birefringent and/or other material(s) used in the polarization rotation plate 160/160'/160'' and optionally patterning these materials. For example, a birefringent material such as $TiO_2$ may be deposited for at an angle of at least forty-five degrees and not more than eighty degrees from a normal to a surface on which the polarization rotation plate is formed. The flux direction for deposition may also be set with respect to some landmark on the surface of the devices in step 204 to configure the birefringent material as desired.

In some embodiments, step 204 might include formation of antireflective coatings, such as the antireflective coatings 162/162' and/or 164/164'. Alternatively, fabrication of these antireflective coating(s) may be accomplished in a separate step.

A HAMR transducer 120/120' is provided, via step 206. In step 206, the main pole 150, coil(s) 155, NFT 130, waveguide 140/140' and, optionally, polarization rotation component 142 may be fabricated on a wafer. Other components of the transducer 120/120' may also be manufactured in step 206. The laser 172, polarization rotation plate 160/160'/160" and transducer 120/120' may also be affixed together and incorporated into the disk drive 100, 100' and/or 100" in step 206. Alternatively, these integration steps may be considered to be separate.

Using the method 200, the HAMR disk drive 100, 100', 100", 100''' and/or 100'''' may be fabricated. The benefit(s) of one or more of the HAMR disk drive(s) 100, 100', 100", 100''' and/or 100'''' may thus be achieved.

Figure 7:
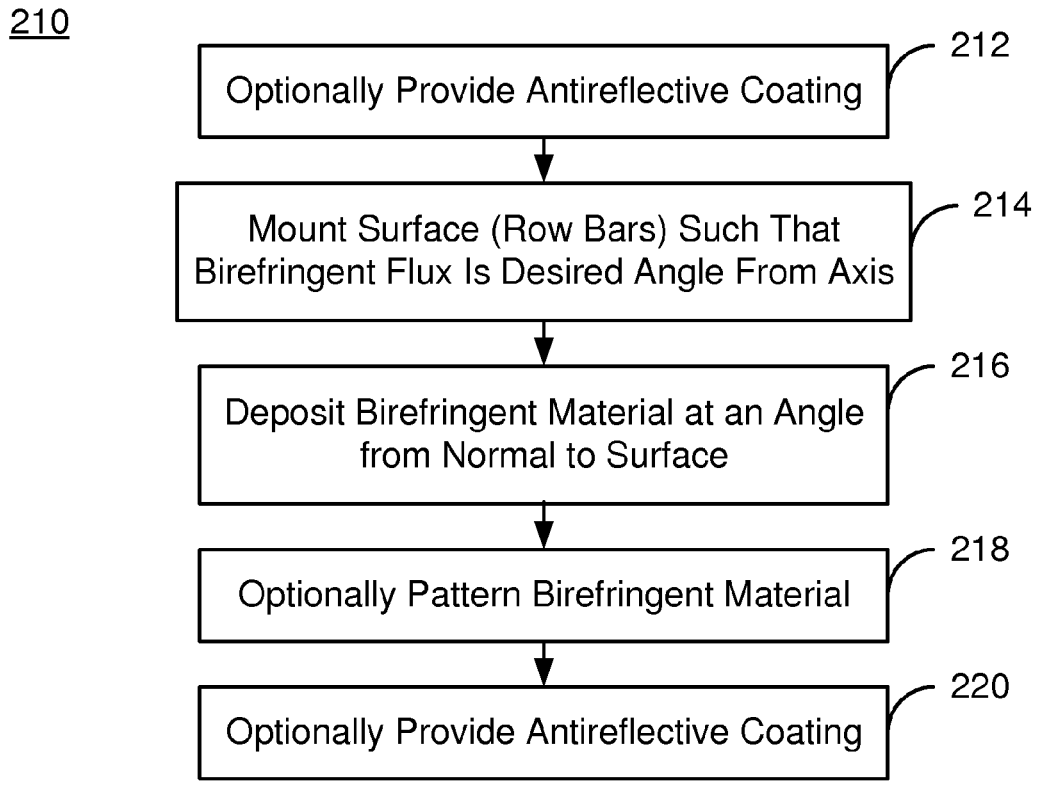
FIG. 7 is a flow chart depicting an exemplary embodiment of a method for fabricating rotation plate for a HAMR writer.

FIG. 7 is a flow chart depicting an exemplary embodiment of a method 210 for fabricating a portion of a HAMR disk drive. For example, the method 210 may primarily be used in forming a polarization rotation plate such as the polarization rotation plate(s) 160, 160', 160", 160''' and/or 160''''. FIGS. 8A and 8B-13 are diagrams depicting various views of another exemplary embodiment of HAMR disk drives 300 and 300' during fabrication using the method 210. For clarity, FIGS. 8A and 8B-13 are not to scale. Referring to FIGS. 7-13, the method 210 is described in the context of the HAMR disk drives 300 and 300'. However, the method 210 may be used to form another device (not shown). The HAMR disk drive 300/300' being fabricated may include other components that are not shown in FIGS. 8A and 8B-13. For example, a read head, a laser, the particular transducers and components thereof are not shown. The method 210 also may commence after formation of other portions of the HAMR disk drive 300/300'. The method 210 is also described in the context of providing single components. However, the method 210 may be used to fabricate multiple components at substantially the same time. The method 210 and device 300 are also described in the context of particular layers. However, in some embodiments, such layers may include multiple sublayers.

An antireflective coating is optionally provided, via step 212. Step 212 may include depositing a multilayer, such as a $Si_3N_4/SiO_2$ multilayer. In other embodiments, other material(s) and/or another number of layers may be provided. The antireflective coating provided in step 212 is configured to reduce or eliminate reflections of light having the wavelength used in the HAMR disk drive.

The devices on which the polarization rotation plate is to be fabricated are mounted, via step 214. For example, if the polarization rotation plate is to be fabricated on the back surface of the slider, then step 214 includes mounting the row bars containing the transducers/sliders on a substrate such that the vapor flux of birefringent material(s) being deposited has the desired direction (vapor flux direction). For example, if an e-beam evaporation process is used, the birefringent materials are deposited on the row bars in the vapor flux direction. Stated differently, step 214 includes mounting the devices in the deposition apparatus such that the birefringent material being deposited has its ordinary and extraordinary axes in the directions desired. In such an embodiment, the row bars having a long axis along which multiple sliders exist. The row bars may be mounted such that the vapor flux direction is forty-five degrees from the long axis of the plurality of row bars.

The birefringent material(s) for the polarization rotation plate are deposited at an angle from normal to the surface on which the polarization rotation plate is to be fabricated, via step 216. In some embodiments, this angle is at least forty-five degrees and not more than eighty degrees. In some such embodiments, the angle is at least sixty degrees and not more than eighty degrees from normal to the surface. For example, the angle may be nominally seventy degrees. Because the birefringent material(s) deposited in step 216 may be under high stress, step 216 may include annealing the devices. For example, a rapid thermal anneal may be performed. Such a step may reduce the stress in the polarization plate being fabricated. Also in step 216, the desired thickness of birefringent materials may be provided. For example, a thickness corresponding to a quarter-wave plate or a half-wave plate may be deposited. Steps 212, 214 and 216 may result in material(s) having a high birefringence being fabricated. Thus, the polarization plate being fabricated may have a birefringence of at least 0.1.

Figure 8A:
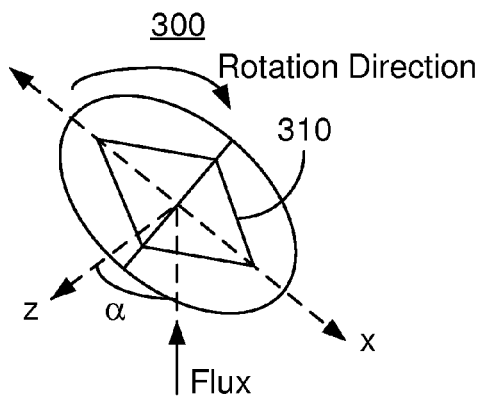
FIGS. 8A and 8B depict perspective and side views of an exemplary embodiment of a wafer during fabrication of the HAMR disk drive.
Figure 8B:
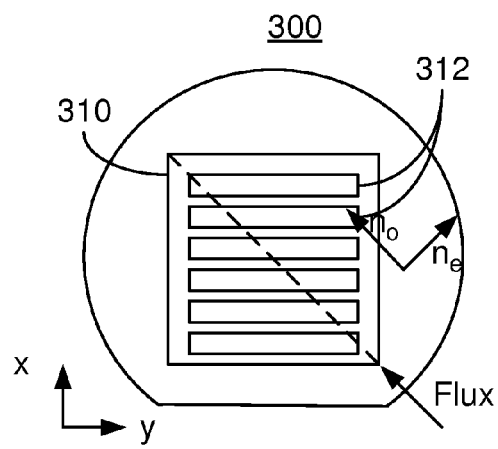
Figure 9:
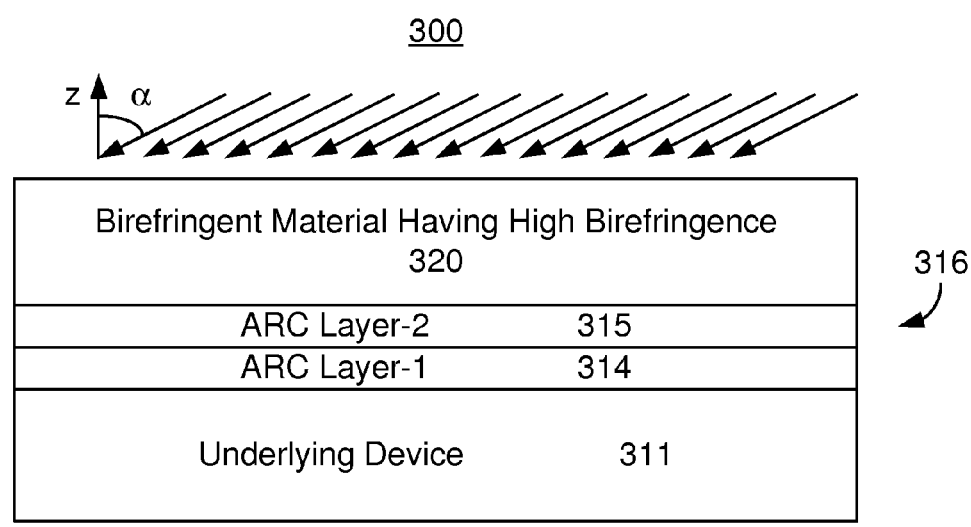
FIGS. 9-13 depict side views of an exemplary embodiment of a HAMR transducer during fabrication.

FIGS. 8A, 8B and 9 depict portions of the HAMR disk drives during steps 212, 214 and 216. FIG. 8A is a perspective view depicting the vapor flux direction at an angle from the substrate 310. FIG. 8B is a plan view depicting the substrate 310 and the row bars 312 mounted on the substrate. FIG. 9 is a side view of a portion of the devices. As can be seen in FIG. 8A, the vapor flux direction (labeled Flux in FIG. 8A) is at an angle, a, from the z-direction. The z-direction is normal to the surface of the substrate 310 and row bars 312, which are substantially in the x-y plane. The substrate 310 may also be rotated during deposition, as shown in FIG. 8A by the curved arrow. In some embodiments, the rotation is accomplished via one hundred and eighty degree stepwise rotations. The row bars 312 are also mounted such that their long axis is substantially forty-five degrees from the vapor flux direction (labeled Flux in FIG. 8B). The resulting ordinary and extraordinary axes for the birefringent material(s) deposited are shown as items $n_o$ and $n_e$, respectively, in FIG. 8B. As can be seen in FIG. 9, the antireflective coating layers (ARC layers) 314 and 315 have been deposited on underlying device 311 in step 212. Together, the ARC layers 314 and 315 form antireflective coating 316. The underlying device may include the HAMR transducer and slider that are part of the row bars 312. In another embodiment, the underlying device 311 might be the laser. FIG. 9 also depicts the angle, a, at which the birefringent material(s) are deposited. Thus, if an e-beam evaporation process is used, the substrate may be tilted at an angle, a, from the vapor flux direction. Although the birefringent material(s) are shown as a continuous layer, in other embodiment, islands that do not occupy the entire surface of the row bars 312 or sliders may be provided.

The birefringent material(s) 320 are optionally patterned, via step 218. Step 218 may be performed using photolithography. This patterning may be performed such that the polarization rotation plate being fabricated occupies only a portion of the slider back surface or only a portion of the laser surface. Another antireflective coating may also optionally be provided, via step 220. Step 220 may include depositing a multilayer, such as a $Si_3N_4/SiO_2$ multilayer. In other embodiments, other material(s) and/or another number of layers may be provided. The antireflective coating provided in step 220 is configured to reduce or eliminate reflections of light having the wavelength used in the HAMR disk drive. In some embodiments, step 218 is performed before step 220. In other embodiments, step 218 is performed after step 220.

Figure 10:
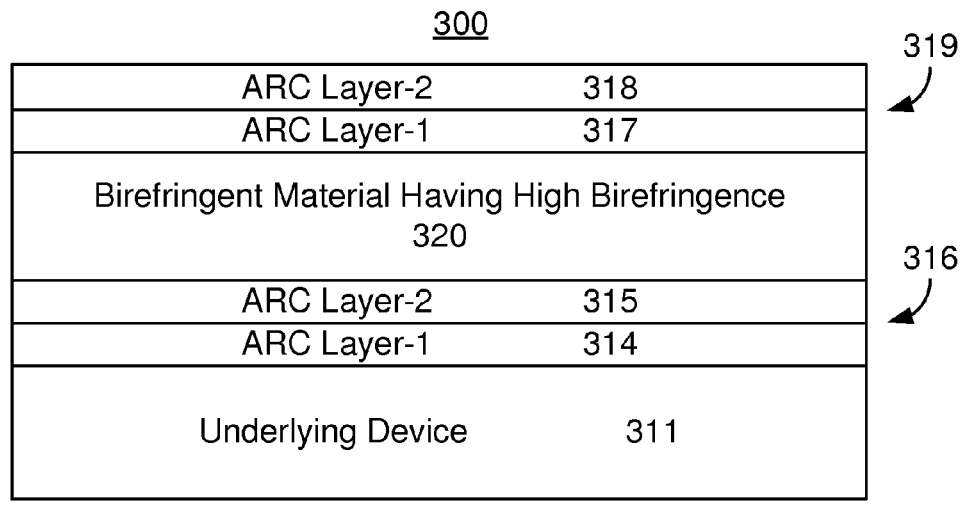
Figure 11:
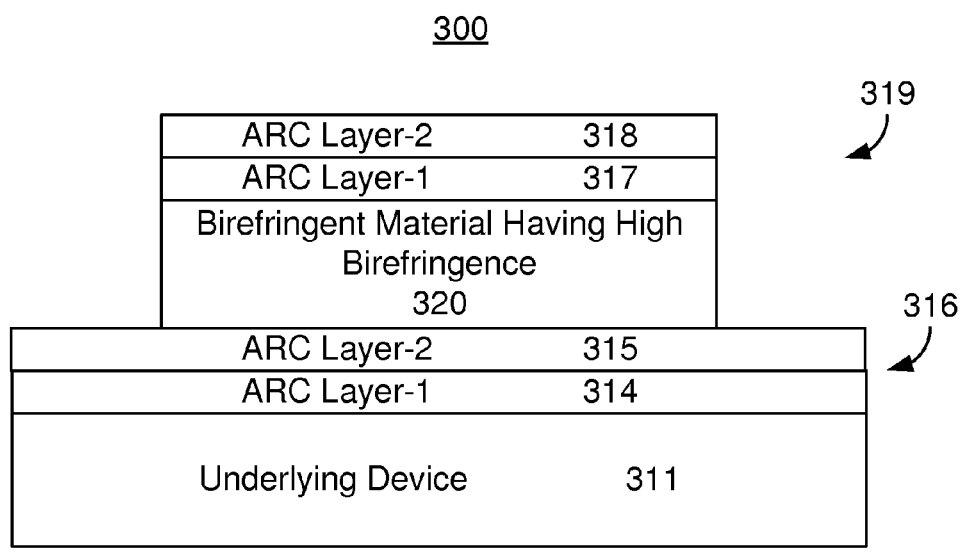

FIGS. 10 and 11 depict side views of a portion of the HAMR disk drive 300 when step 218 is performed after step 220. Thus, the antireflective coating 319 is formed first. FIG. 10 depicts the HAMR disk drive 300 after step 320 is performed. In the embodiment shown, the antireflective coating 319 includes two ARC layers 317 and 318. The patterning step 318 is then performed. FIG. 11 depicts a portion of the HAMR disk drive 300 after step 318 is performed. Thus, the antireflective coating 319 and birefringent material(s) 320 have been patterned. In this embodiment, the bottom antireflective coating 316 has not been patterned. However, in other embodiments, portions of the antireflective coating 316 not covered by the birefringent material(s) 320 may be removed.

Figure 12:
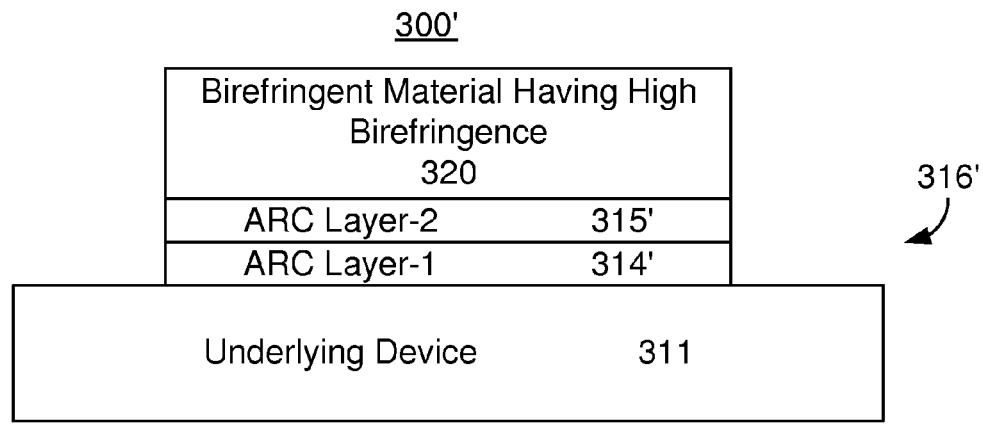
Figure 13:
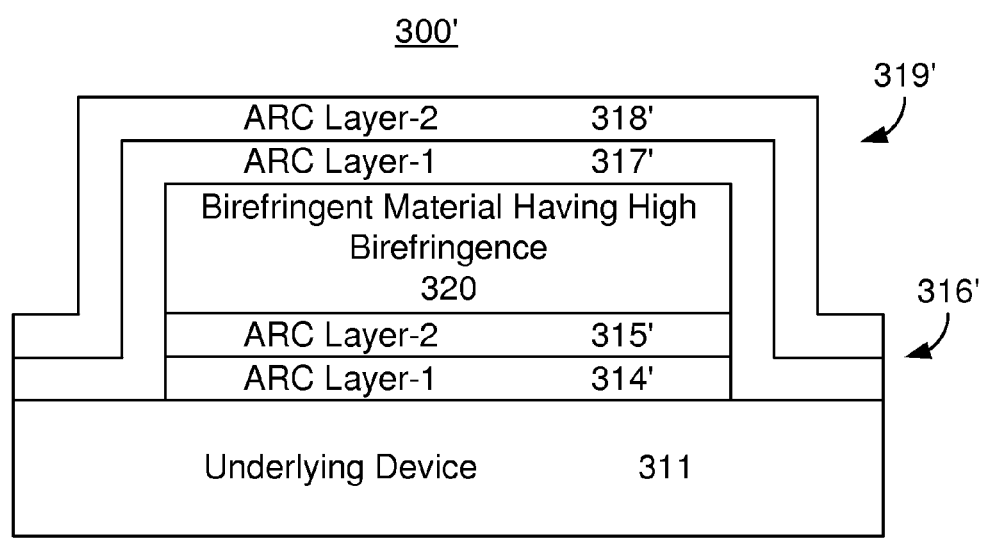

FIGS. 12 and 13 depict side views of a portion of the HAMR disk drive 300' when step 220 is performed after step 218. Thus, the birefringent material(s) 320 are patterned first. FIG. 12 depicts a portion of the HAMR disk drive 300' after step 318 is performed. Thus, the antireflective coating 316' and birefringent material(s) 320 have been patterned. In other embodiments, portions of the antireflective coating 316' not covered by the birefringent material(s) 320 may not be removed. Step 220 is then performed. Thus, the antireflective coating 319' is formed. In the embodiment shown, the antireflective coating 319' includes two ARC layers 317' and 318'. In addition, the antireflective coating 319' covers the sides of the patterned birefringent material(s) 320 and antireflective coating 316'. Using the method 210, the HAMR disk drive(s) 300 and 300' may be fabricated. Performance and/or reliability of the disk drives 300 and 300' may thus be improved in a manner analogous to the HAMR disk drives 100, 100', 100", 100'" and/or 100"".

We claim:

1. A heat assisted magnetic recording (HAMR) write apparatus comprising:
a laser for providing energy having a first polarization state;
a polarization rotation plate optically coupled with the laser and for changing the first polarization state to a second polarization state; and
a HAMR transducer having an air-bearing surface (ABS) configured to reside in proximity to a media during use, a waveguide, a main pole, at least one coil and a near-field transducer (NFT), the polarization rotation plate being between the HAMR transducer and the laser, the waveguide being optically coupled with the laser through the polarization rotation plate and for directing the energy from the polarization rotation plate toward the ABS, the NFT being proximate to the ABS and for focusing the energy onto a region of the media, the NFT being optically coupled with the waveguide and receiving energy having a third polarization state, the main pole being configured to write to the region of the media, the at least one coil for energizing the main pole.

2. The HAMR write apparatus of claim 1 wherein the polarization rotation plate is a thin film polarization rotation plate having a thickness of not more than 10 micrometers.

3. The HAMR write apparatus of claim 2 wherein the thin film polarization rotation plate is a half wave plate and wherein the second polarization state is equal to the third polarization state.

4. The HAMR write apparatus of claim 3 wherein the main pole is in a down track direction from the NFT and wherein the second polarization state is a transverse magnetic (TM) mode in the down track direction.

5. The HAMR write apparatus of claim 3 wherein the half wave plate has a birefringence of at least 0.1 and a thickness of not more than 6 microns.

6. The HAMR write apparatus of claim 2 wherein the thin film polarization rotation plate is integrated onto a slider back side, the slider including the HAMR transducer.

7. The HAMR write apparatus of claim 2 wherein the laser has a surface, the energy from the laser being provided to the HAMR transducer through the surface, the thin film polarization rotation plate being integrated onto the surface of the laser.

8. The HAMR write apparatus of claim 2 wherein the thin film polarization rotation plate further includes a first surface adjacent to the laser and a second surface adjacent to the HAMR transducer, the HAMR write apparatus further comprising:
a having first antireflective coating on the first surface; and
a second antireflective coating the second surface.

9. The HAMR write apparatus of claim 2 wherein the second polarization state is different from the third polarization state.

10. The HAMR write apparatus of claim 9 wherein the thin film polarization rotation plate is a quarter wave plate and wherein the waveguide is configured to rotate the polarization of the energy from second polarization state to the third polarization state.

11. A heat assisted magnetic recording (HAMR) disk drive comprising:
a media;
a laser for providing energy having a first polarization state;
a slider having a media-facing surface and a back surface opposite to the media-facing surface, the laser being mounted on the back surface, the slider further including a HAMR write transducer, a thin film half wave plate, a first antireflective coating and a second antireflective coating, the thin film half wave plate being between the HAMR write transducer and the laser, the first antireflective coating being between the laser and the thin film half wave plate, the second antireflective coating being between the HAMR write transducer and the thin film half wave plate, the thin film half wave plate for changing the first polarization state of the energy to a second polarization state ninety degrees from the first polarization state, the thin film half wave plate having a thickness of not more than 6 micrometers, the HAMR transducer including a waveguide, a main pole, at least one coil and a near-field transducer (NFT), the waveguide being optically coupled with the laser through the thin film half wave plate and for directing the energy in the second polarization state toward the media-facing surface, the NFT being proximate to the media-facing surface and for focusing the energy onto a region of the media, the NFT being optically coupled with the waveguide and receiving the energy having the second polarization state, the main pole being configured to write to the region of the media, the at least one coil for energizing the main pole.

12. A method for fabricating a heat assisted magnetic recording (HAMR) write apparatus comprising:
providing a laser for providing energy having a first polarization state;
providing a polarization rotation plate optically coupled with the laser and for changing the first polarization state to a second polarization state; and
providing a HAMR transducer having an air-bearing surface (ABS) configured to reside in proximity to a media during use, a waveguide, a main pole, at least one coil and a near-field transducer (NFT), the polarization rotation plate being between the HAMR transducer and the laser, the waveguide being optically coupled with the polarization rotation plate and for directing the energy from the laser toward the ABS, the NFT being proximate to the ABS and for focusing the energy onto a region of the media, the NFT being optically coupled with the waveguide and receiving energy having a third polarization state, the main pole being configured to write to the region of the media, the at least one coil for energizing the main pole.

13. The method of claim 12 wherein the polarization rotation plate is a thin film polarization rotation plate having a thickness of not more than 10 micrometers.

14. The method of claim 13 wherein the step of providing the polarization rotation plate further includes:
depositing a birefringent material for the polarization rotation plate at an angle of at least forty-five degrees and not more than eighty degrees from a normal to a surface for the polarization rotation plate.

15. The method of claim 14 wherein the surface for the thin film polarization rotation plate is on a slider back surface, the slider including the HAMR transducer, the step of providing the thin film polarization rotation plate further includes:
mounting a plurality of row bars on a substrate, the plurality of row bars including the slider having the HAMR transducer, the plurality of row bars having a long axis; and wherein the step of depositing the birefringent material further includes
providing the birefringent material in a vapor flux direction, the vapor flux direction being forty-five degrees from the long axis of the plurality of row bars.

16. The method of claim 15 further comprising:
patterning the birefringent material deposited on the slider back surface such that the thin film polarization rotation plate occupies only a portion of the slider back surface.

17. The method of claim 13 wherein the thin film polarization rotation plate is a half wave plate and wherein the second polarization state is equal to the third polarization state.

18. The method of claim 13 wherein the main pole is in a down track direction from the NFT and wherein the second polarization state is a transverse magnetic (TM) mode in the down track direction.

19. The method of claim 13 wherein the laser has a surface, the energy from the laser being provided to the HAMR transducer through the surface, the step of providing the thin film polarization rotation plate including:
depositing a birefringent material onto the surface of the laser at an angle of at least forty-five degrees and not more than eighty degrees from a normal to the surface of the laser.

20. The method of claim 13 wherein the thin film polarization rotation plate has a first surface adjacent to the laser and a second surface adjacent of the transducer, the method further comprising:
providing a first antireflective coating on the first surface; and
providing a second antireflective coating on the second surface.

21. The method of claim 13 wherein the step of providing the thin film polarization plate further includes:
providing a quarter wave plate, the waveguide is configured to rotate the polarization of the energy from second polarization state to the third polarization state.

* * * * *